(12) United States Patent
Madey

(10) Patent No.: US 12,344,369 B2
(45) Date of Patent: Jul. 1, 2025

(54) HELICAL DYNAMIC SEAL RING

(71) Applicant: GOODRICH CORPORATION, Charlotte, NC (US)

(72) Inventor: Kyle M. Madey, Broadview Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 110 days.

(21) Appl. No.: 18/312,863

(22) Filed: May 5, 2023

(65) Prior Publication Data

US 2024/0367783 A1    Nov. 7, 2024

(51) Int. Cl.
*B64C 25/60* (2006.01)
*F16F 9/36* (2006.01)
*F16J 9/04* (2006.01)

(52) U.S. Cl.
CPC .............. *B64C 25/60* (2013.01); *F16F 9/36* (2013.01); *F16F 9/362* (2013.01); *F16J 9/04* (2013.01); *F16F 9/368* (2013.01)

(58) Field of Classification Search
CPC ...... B64C 25/60; F16J 9/04; F16F 9/36; F16F 9/362; F16F 9/365; F16F 9/368
See application file for complete search history.

(56) References Cited

U.S. PATENT DOCUMENTS

| | | | | |
|---|---|---|---|---|
| 208,368 A * | 9/1878 | Brown | ..................... | F16J 15/20 277/528 |
| 1,385,556 A * | 7/1921 | Le | .............................. | F16J 9/04 277/450 |
| 1,421,203 A | 6/1922 | Ford | | |
| 1,711,244 A * | 4/1929 | Newton | ..................... | F16J 9/04 277/458 |
| 1,920,470 A * | 8/1933 | Kurth | ........................ | F16J 9/04 277/453 |
| 2,124,623 A * | 7/1938 | Kurth | ........................ | F01N 3/32 277/476 |
| 2,585,952 A * | 2/1952 | Marien | ..................... | F16J 9/04 277/444 |
| 2,650,869 A * | 9/1953 | Marien | ..................... | F16J 9/04 277/447 |
| 2,809,080 A * | 10/1957 | Mittell | .................. | F16J 15/166 277/584 |
| 4,333,661 A * | 6/1982 | Merrell | ..................... | F16J 9/04 277/946 |

(Continued)

FOREIGN PATENT DOCUMENTS

WO    2012113349    8/2012

OTHER PUBLICATIONS

European Patent Office, European Search Report dated Sep. 12, 2024 in Application No. 24174173.5.

*Primary Examiner* — Nicholas L Foster
(74) *Attorney, Agent, or Firm* — SNELL & WILMER L.L.P.

(57) ABSTRACT

A helically shaped dynamic seal ring is provided. The helically shaped dynamic seal ring includes a spirally wound body and a snubbing orifice area formed in the spirally wound body. The spirally wound body is configured to expand in response to contacting a snubbed stroke range of an actuator piston. The spirally wound body is configured to contract in response to distancing from the snubbed stroke range of the actuator piston.

8 Claims, 9 Drawing Sheets

(56) References Cited

U.S. PATENT DOCUMENTS

| | | | |
|---|---|---|---|
| 4,576,381 A * | 3/1986 | Slack | F16J 9/28 |
| | | | 277/497 |
| 5,028,055 A | 7/1991 | Rehfeld | |
| 6,045,136 A | 4/2000 | White | |
| 8,387,990 B2 | 3/2013 | Castleman et al. | |
| 2012/0216673 A1 | 8/2012 | Chang | |
| 2019/0076929 A1* | 3/2019 | Ko | F16J 1/008 |

* cited by examiner

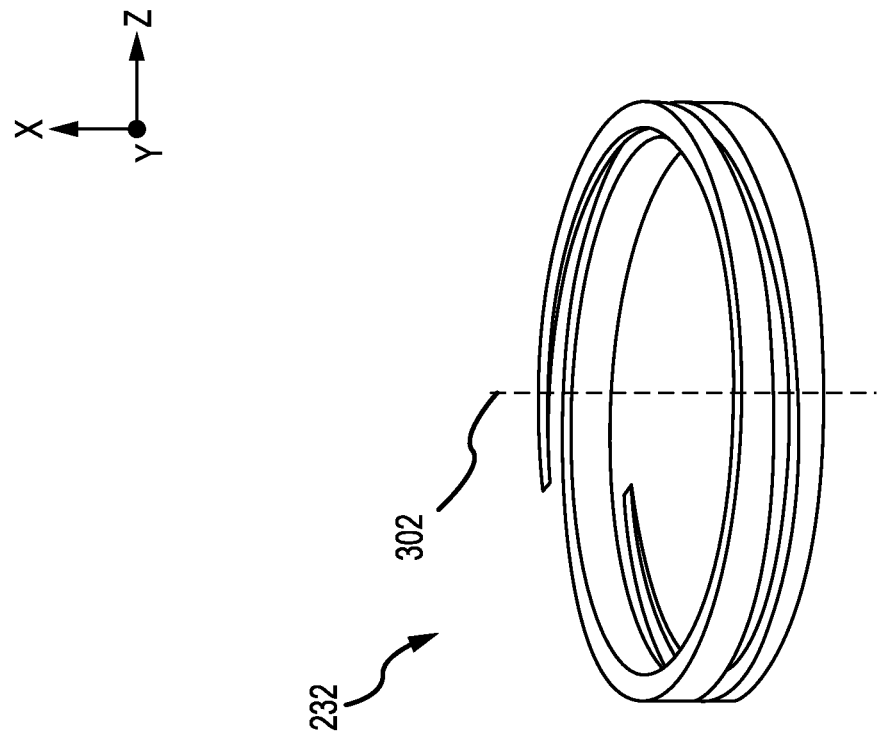
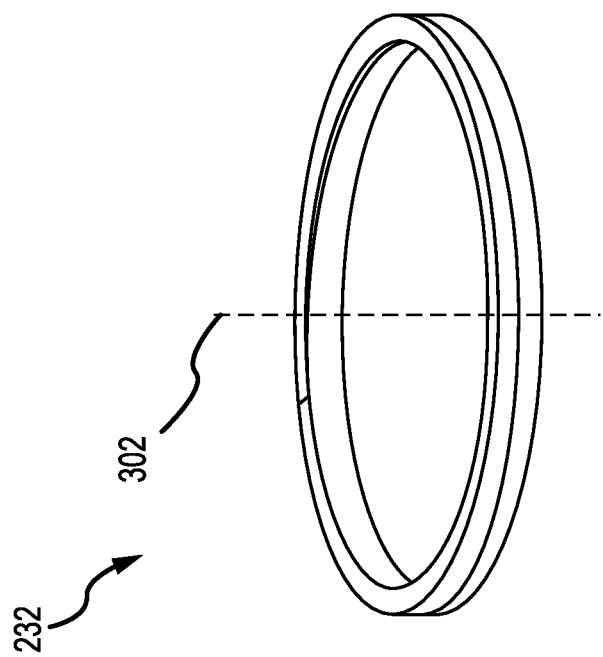

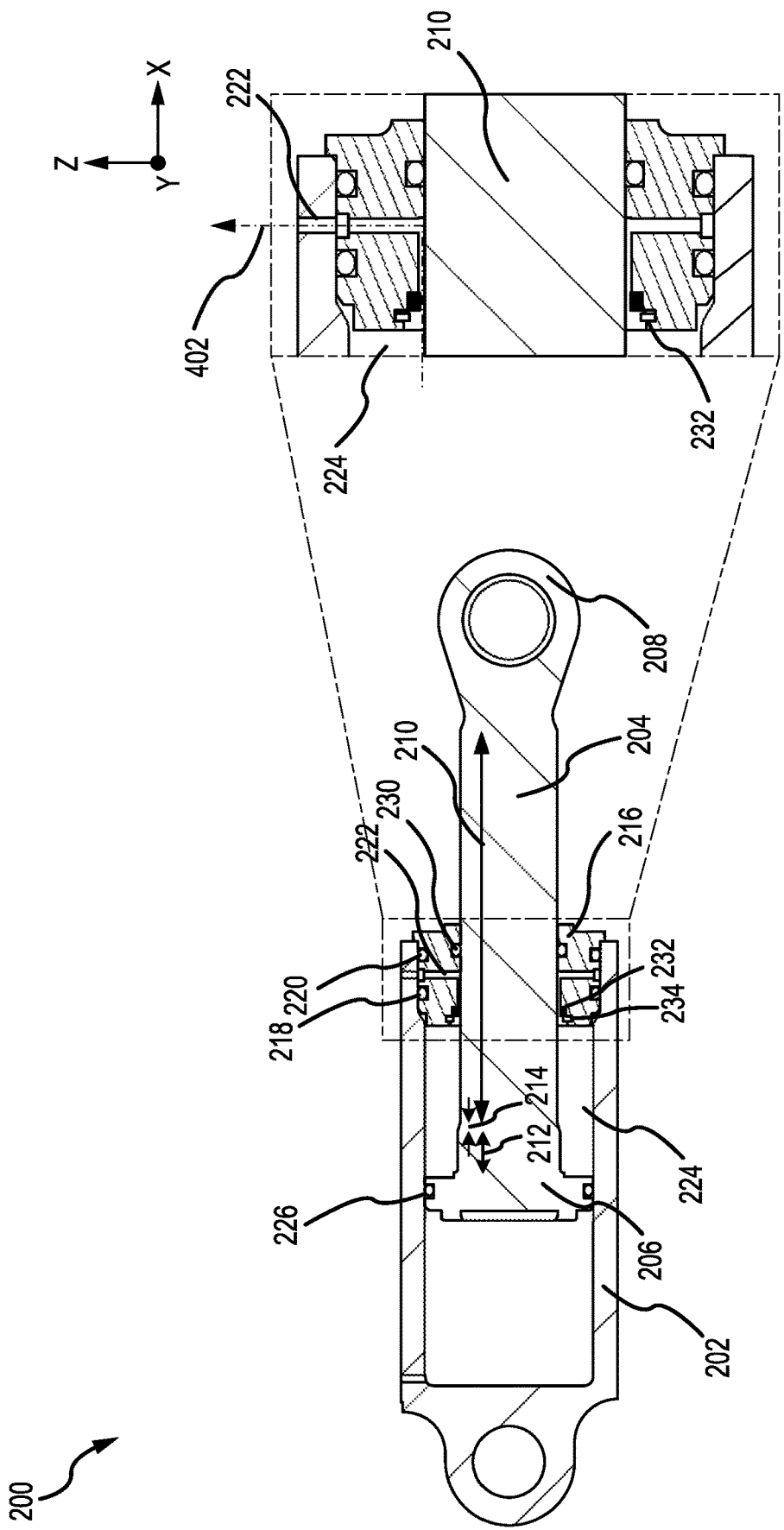

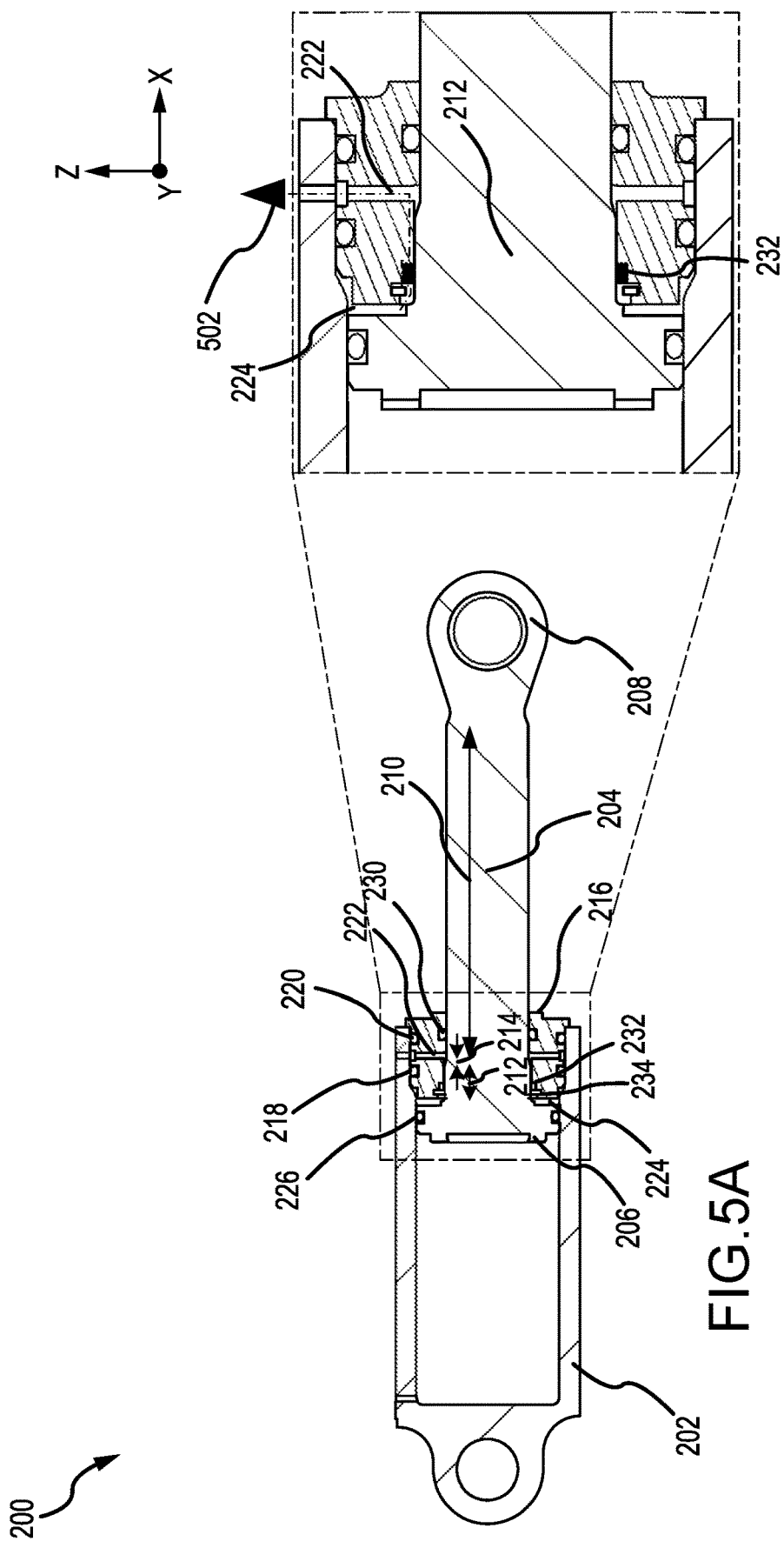

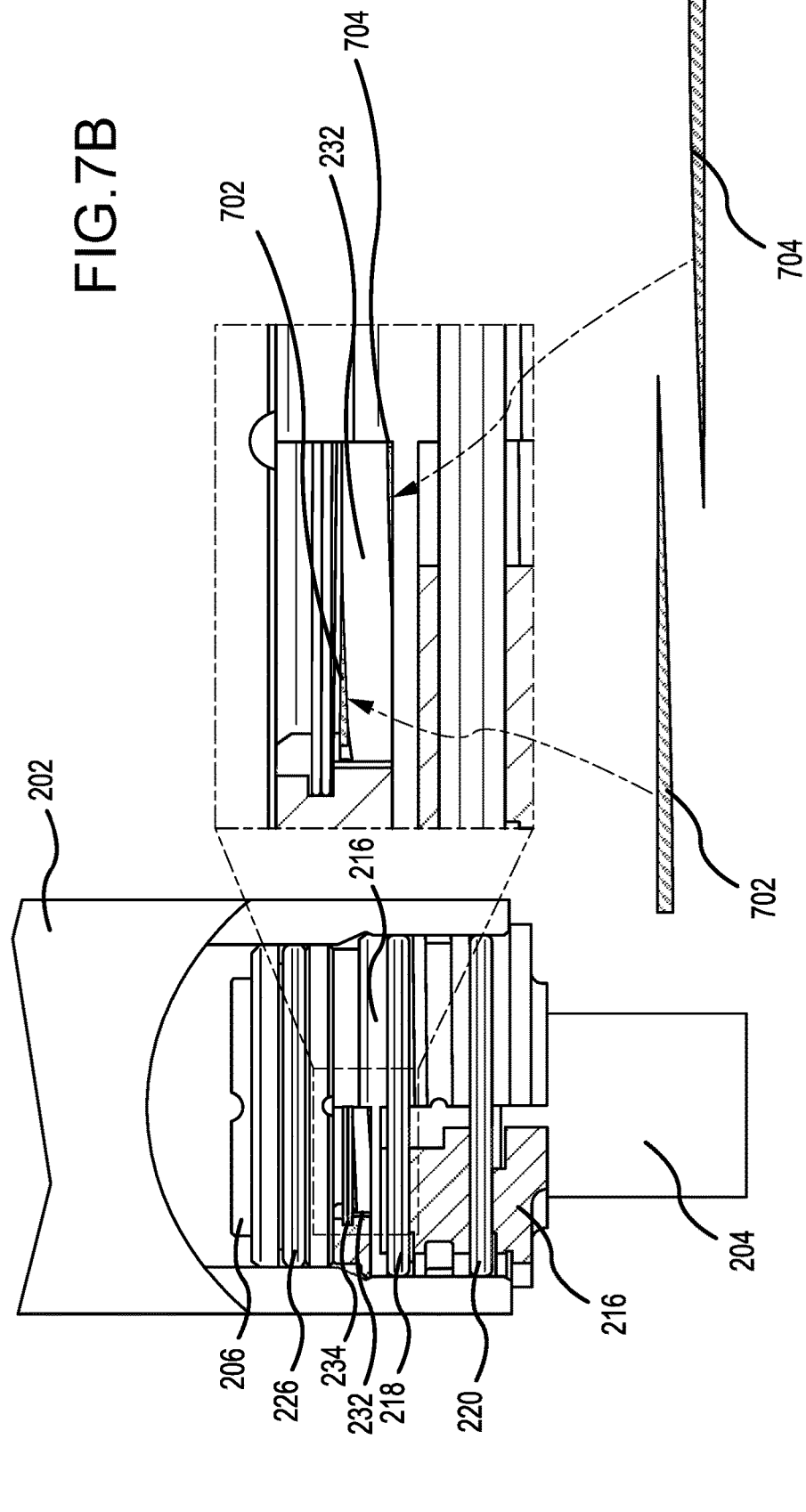

HELICAL DYNAMIC SEAL RING

FIELD

The present disclosure relates generally to aircraft landing systems and, more particularly, to a helical dynamic seal ring for landing gear actuator.

BACKGROUND

Landing gear actuation systems generally utilize hydraulic components that work with a central or a localized hydraulic system. Such hydraulic actuation systems include many seal rings and gaskets that retain the hydraulic fluid within the hydraulic actuation systems. Designs for typical dynamic seal rings within hydraulic actuation systems have a limited level of manufacturing precision that has proven inadequate for some applications to prevent failures and reduce the variability of test results for snubbing velocities of hydraulic actuators.

SUMMARY

Disclosed herein is a helically shaped dynamic seal ring. The helically shaped dynamic seal ring includes a spirally wound body and a snubbing orifice area formed in the spirally wound body. The spirally wound body is configured to expand in response to contacting a snubbed stroke range of an actuator piston. The spirally wound body is configured to contract in response to distancing from the snubbed stroke range of the actuator piston.

In various embodiments, the snubbing orifice area may be changed by removing material from the spirally wound body. In various embodiments, the snubbing orifice area may be decreased by removing material from a face of the spirally wound body. In various embodiments, the snubbing orifice area may be increased by removing material from at least one end of the spirally wound body.

In various embodiments, the helically shaped dynamic seal ring is configured to be positioned within a seal groove of a bearing and held within the seal groove via a snap ring. In various embodiments, the spirally wound body is at least one of a spirally wound rectangular wire whose turns or revolutions are kept in contact or a spiral cut tube.

Also disclosed herein is a landing gear assembly. The landing gear assembly includes an actuator cylinder, an actuator piston slidably disposed within the actuator cylinder, and a helically shaped dynamic seal ring. The helically shaped dynamic seal ring includes a spirally wound body and a snubbing orifice area formed in the spirally wound body. The spirally wound body is configured to expand in response to contacting a snubbed stroke range of the actuator piston. The spirally wound body is configured to contract in response to distancing from the snubbed stroke range of the actuator piston.

In various embodiments, the snubbing orifice area may be decreased by removing material from a face of the spirally wound body. In various embodiments, the snubbing orifice area may be increased by removing material from at least one end of the spirally wound body.

In various embodiments, the helically shaped dynamic seal ring is positioned within a seal groove of a bearing and held within the seal groove via a snap ring. In various embodiments, the bearing is positioned within an end of the actuator cylinder and the bearing is positioned around a shaft portion of the actuator piston. In various embodiments, fluid is configured to flow between the helically shaped dynamic seal ring and a standard stroke range of the actuator piston and out an opening of the bearing in response to the helically shaped dynamic seal ring being distanced from the snubbed stroke range of the actuator piston. In various embodiments, fluid is configured to flow between the helically shaped dynamic seal ring and the seal groove and out an opening of the bearing in response to the helically shaped dynamic seal ring being in contact with the snubbed stroke range of the actuator piston.

In various embodiments, the spirally wound body is at least one of a spirally or spring wound rectangular wire whose turns or revolutions are kept in contact or a spiral cut tube.

Also disclosed herein is an aircraft. The aircraft includes a landing gear assembly. The landing gear assembly includes an actuator cylinder, an actuator piston slidably disposed within the actuator cylinder, and a helically shaped dynamic seal ring. The helically shaped dynamic seal ring includes a spirally wound body and a snubbing orifice area formed in the spirally wound body. The spirally wound body is configured to expand in response to contacting a snubbed stroke range of the actuator piston. The spirally wound body is configured to contract in response to distancing from the snubbed stroke range of the actuator piston.

In various embodiments, the snubbing orifice area is changeable by removing material from the spirally wound body. In various embodiments, the helically shaped dynamic seal ring is positioned within a seal groove of a bearing and held within the seal groove via a snap ring. In various embodiments, the bearing is positioned within an end of the actuator cylinder and wherein the bearing is positioned around a shaft portion of the actuator piston. In various embodiments, fluid is configured to flow between the helically shaped dynamic seal ring and a standard stroke range of the actuator piston and out an opening of the bearing in response to the helically shaped dynamic seal ring being distanced from the snubbed stroke range of the actuator piston. In various embodiments, fluid is configured to flow between the helically shaped dynamic seal ring and the seal groove and out an opening of the bearing in response to the helically shaped dynamic seal ring being in contact with the snubbed stroke range of the actuator piston.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 3A and 3B illustrate a helically shaped dynamic seal ring for use in landing gear assemblies, in accordance with various embodiments.

FIGS. 4A and 4B illustrate a cross-sectional view of a hydraulic actuator in an unsnubbed stroke position, in accordance with various embodiments.

FIGS. 5A and 5B illustrate a cross-sectional view of a hydraulic actuator in a snubbed stroke position, in accordance with various embodiments.

FIGS. 7A, 7B, and 7C illustrate a partial cut-away and detailed view of the helically shaped dynamic seal ring's snubbing orifice, in accordance with various embodiments.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is helically shaped dynamic seal ring for a hydraulic actuator of a landing gear assembly. In various embodiments, responsive to being installed in a seal groove within a bearing in an inside diameter (ID) of a cylinder of the hydraulic actuator, coils of the helically shaped dynamic seal ring wrap around an outside diameter (OD) of a piston rod. In various embodiments, the helically shaped dynamic seal ring is configured to expand or contract radially to engage or disengage seal contact. In various embodiments, the helically shaped dynamic seal ring is configured with one or more triangular orifice areas that provide two-way restrictor configuration options and re-work capability. In various embodiments, the design of the helically shaped dynamic seal ring provides an improvement over existing split ring designs with respect to sealing along the circumference, elimination of unwanted leak paths, and reducing sensitivity of snubbing orifice variability to machine tolerances.

Figure 1:
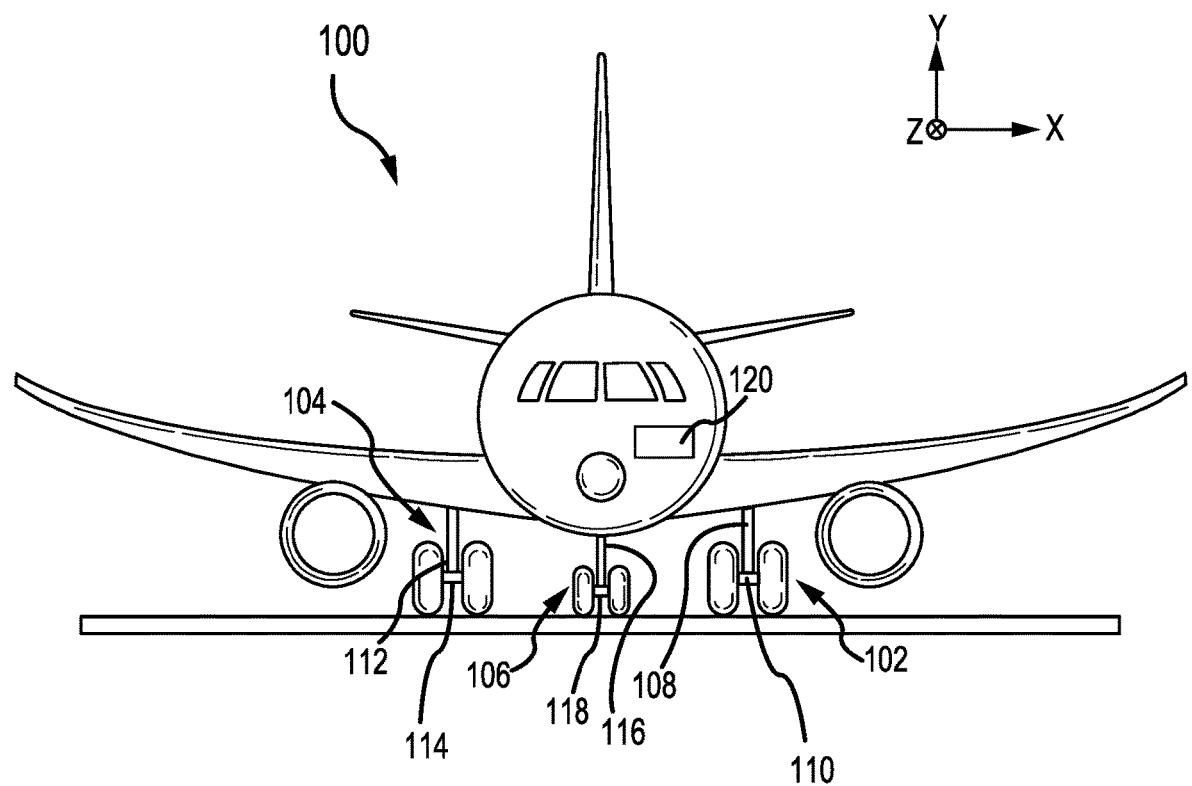
FIG. 1 illustrates an aircraft having left, right, and nose landing gear assemblies and wheels mounted thereon, in accordance with various embodiments.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support the aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Figure 2:
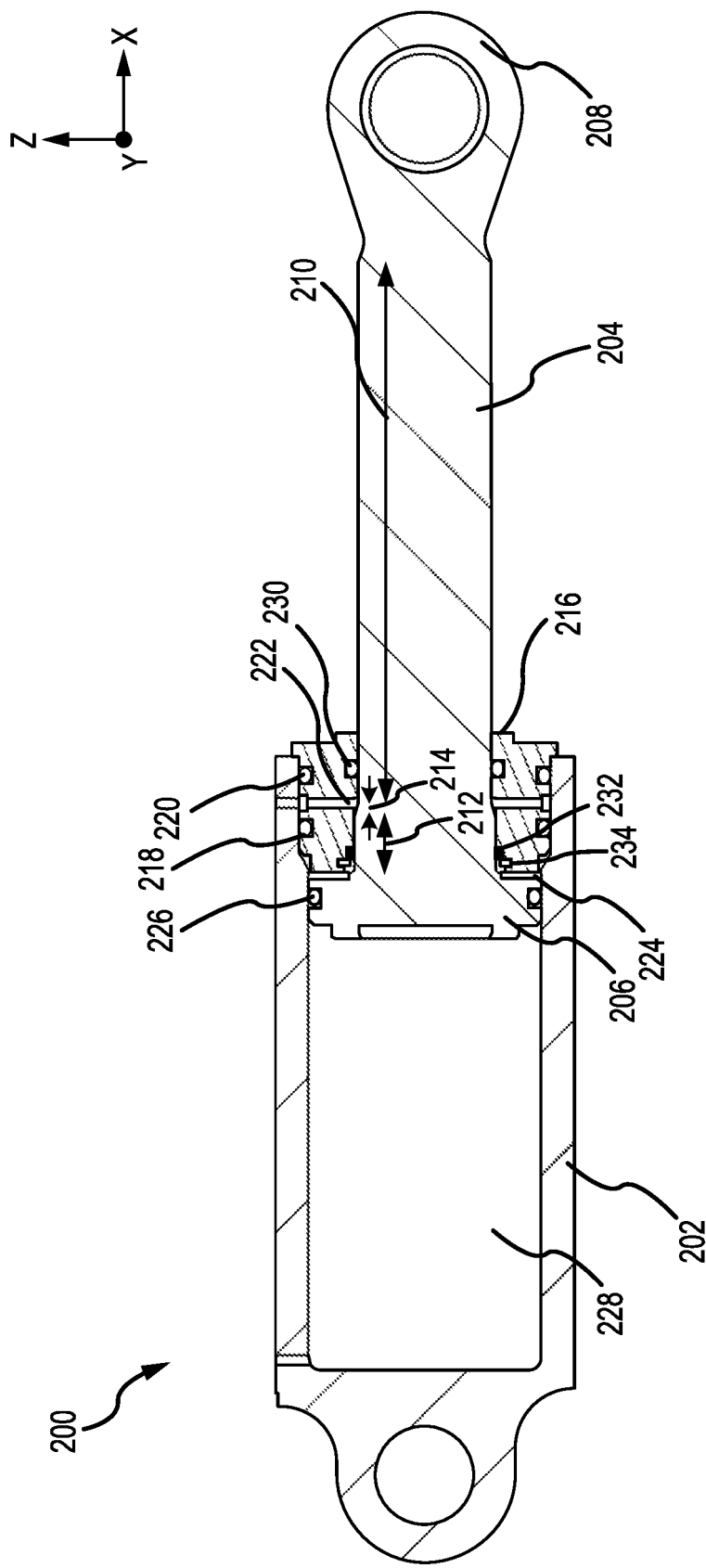
FIG. 2 illustrates a cross-sectional view of a hydraulic actuator that utilizes a helically shaped dynamic seal ring, in accordance with various embodiments.

Referring now to FIG. 2, a cross-sectional view of a hydraulic actuator 200 that utilizes a helically shaped dynamic seal ring, similar to those used in landing gear assemblies described above with reference to FIG. 1, is illustrated, in accordance with various embodiments. In various embodiments, the hydraulic actuator 200 includes an actuator cylinder 202 and an actuator piston 204. In various embodiments, the actuator piston 204 is operatively coupled to slide or telescope within the actuator cylinder 202. In various embodiments, the actuator piston 204 may include a first end or piston head 206 disposed within the actuator cylinder 202 and a second end 208 extending from the actuator cylinder 202. In various embodiments, a shaft or center portion of the actuator piston 204 between the first end or piston head 206 and the second end 208 may include a standard stroke range 210, a snubbed stroke range 212, and a ramping range 214. In various embodiments, the actuator cylinder 202 may be configured to receive the actuator piston 204 in a manner that allows the two components to telescope together. FIG. 2 illustrates the hydraulic actuator 200 in an extended position. In various embodiments, when in a compressed position, the actuator piston 204 will have translated or slid a distance into the actuator cylinder 202 from that illustrated in FIG. 2.

In various embodiments, the hydraulic actuator 200 further includes a bearing 216 positioned around a portion of the actuator piston 204, specifically the shaft or center portion of the actuator piston 204. In various embodiments, a first gasket or seal 218 and a second gasket or seal 220 are configured to fluidly seal the bearing 216 within a lower end, i.e. in an x-direction, of the actuator cylinder 202. In various embodiments, the bearing 216 may permit the actuator piston 204 and the actuator cylinder 202 to telescope together. In various embodiments, the bearing 216 may include a channel and opening 222 through which fluid (e.g., oil and/or gas) may pass into and out of first area 224 within the actuator cylinder 202 between a lower surface, i.e. in an x-direction, of the piston head 206 and an upper surface, i.e. in a negative x-direction, of the bearing 216. In various embodiments, the channel and opening 222 includes a channel that circumferentially encircles the actuator piston 204 with an opening that allows fluid to flow into and out of the first area 224. In various embodiments, a third gasket or seal 226 restricts the flow of fluid (e.g., oil and/or gas) from the first area 224 to or from second area 228 within the actuator cylinder 202 between an upper surface, i.e. in a negative x-direction, of the piston head 206. In various embodiments, fourth seal or gasket 230 is configured to fluidly seal the standard stroke range 210 of the actuator piston 204 within the bearing 216.

In various embodiments, the bearing 216 further includes a helically shaped dynamic seal ring 232 that is positioned within bearing 216 in a seal groove and held in place within the bearing 216 by a snap ring 234. The helically shaped dynamic seal ring 232 is configured to wrap around an outside diameter (OD) of the snubbed stroke range 212 of the actuator piston 204. In that regard, in various embodiments, responsive to the actuator piston 204 translating in the positive x-direction, an inside diameter (ID) of the helically shaped dynamic seal ring 232 is configured to contact the ramping range 214 of the actuator piston 204 and expand radially wrapping around an outside diameter (OD) of the snubbed stroke range 212 of the actuator piston 204 thereby creating a dynamic seal with the snubbed stroke range 212 of the actuator piston 204. In various embodiments, responsive to the actuator piston 204 translating in the negative x-direction, the helically shaped dynamic seal ring 232 is configured to contract radially once distanced from the snubbed stroke range 212 and the ramping range 214 of the actuator piston 204.

Referring now to FIGS. 3A and 3B, a helically shaped dynamic seal ring 232 for use in landing gear assemblies is illustrated, in accordance with various embodiments. FIG. 3A illustrates the helically shaped dynamic seal ring 232 in a standard view while FIG. 3B illustrates the helically shaped dynamic seal ring 232 in an exploded view in the x-direction. In various embodiments, the helically shaped dynamic seal ring 232 may be a spirally wound rectangular wire whose turns or revolutions are kept in contact in the x-direction. In various embodiments, top and bottom faces of the helically shaped dynamic seal ring 232 may then be cut or ground flat perpendicular to spring axis 302. In various embodiments, the helically shaped dynamic seal ring 232 may be a spiral cut tube cut using, for example, Electrical Discharge Machining (EDM). In various embodiments, the helically shaped dynamic seal ring 232 is designed to eliminate or reduce leakages associated with typical split gap seal rings. In various embodiments, an inside diameter (ID) of the helically shaped dynamic seal ring 232 is set slightly smaller than an outside diameter (OD) of a snubbed stroke range of the actuator piston, such as the snubbed stroke range 212 of the actuator piston 204 of FIG. 2. In various embodiments, the slightly smaller inside dimeter may be between 25 and 50 micrometers (984.3 and 1969 microinches). In various embodiments, the slightly smaller inside dimeter may be between 30 and 45 micrometers (1181 and 1772 microinches). In various embodiments, the slightly smaller inside dimeter may be between 35 and 40 micrometers (1378 and 1575 microinches). By the ID of the helically shaped dynamic seal ring 232 being set slightly smaller than the outside diameter (OD) of a snubbed stroke range of the actuator piston, circumferential contact with the snubbed stroke range of the actuator piston will be maintained during and after extension of the actuator piston. In various embodiments, as the OD of the actuator piston varies, a height of the helically shaped dynamic seal ring 232 may increase or decrease, which may have little to no effect on the scaling capability of the helically shaped dynamic seal ring 232. In various embodiments, at any given instance, the helically shaped dynamic seal ring 232 may have multiple turns in contact with OD of the snubbed stroke range of the actuator piston which increase the seal of the helically shaped dynamic seal ring 232 to the snubbed stroke range of the actuator piston.

Referring now to FIGS. 4A and 4B, a cross-sectional view of a hydraulic actuator in an unsnubbed stroke position is illustrated, in accordance with various embodiments. The hydraulic actuator 200 illustrated and described in FIGS. 4A and 4B operates in a similar manner to the hydraulic actuator 200 illustrated and described in FIG. 2. Accordingly, elements not specifically described in FIGS. 4A and 4B operate in a similar manner to the elements described in FIG. 2. In various embodiments, as is illustrated in FIGS. 4A and 4B, the actuator piston 204 is in an unsnubbed stroke position such that the bearing 216 is positioned along the standard stroke range 210. In various embodiments, in the unsnubbed stroke position, the helically shaped dynamic seal ring 232 is radially contracted such that the helically shaped dynamic seal ring 232 is not in contact with the snubbed stroke range 212 and fluid in the first area 224 is able to flow, as indicated by flow path 402, past the inside of the helically shaped dynamic seal ring 232 between the helically shaped dynamic seal ring 232 and the standard stroke range 210 of the actuator piston 204 and out the opening 222 when the actuator piston 204 translates in a positive x-direction. In various embodiments, in response to the actuator piston 204 translating in a negative x-direction, fluid may flow into the first area 224 via the opening 222 past the inside of the helically shaped dynamic seal ring 232 between the helically shaped dynamic seal ring 232 and the standard stroke range 210 of the actuator piston 204 while the helically shaped dynamic seal ring 232 is radially contracted such that the helically shaped dynamic seal ring 232 is not in contact with the snubbed stroke range 212.

Referring now to FIGS. 5A and 5B, a cross-sectional view of a hydraulic actuator in a snubbed stroke position is illustrated, in accordance with various embodiments. The hydraulic actuator 200 illustrated and described in FIGS. 5A and 5B operates in a similar manner to the hydraulic actuator 200 illustrated and described in FIG. 2. Accordingly, elements not specifically described in FIGS. 5A and 5B operate in a similar manner to the elements described in FIG. 2. In various embodiments, as is illustrated in FIGS. 5A and 5B, the actuator piston 204 is in a snubbed stroke position such that the bearing 216 is position along the snubbed stroke range 212. In various embodiments, in the snubbed stroke position, the helically shaped dynamic seal ring 232 is radially expanded such that the helically shaped dynamic seal ring 232 is in contact with the snubbed stroke range 212 and fluid in the first area 224 is able to flow, as indicated by flow path 502, around an outside of the helically shaped dynamic seal ring 232, via a set of snubbing orifices, between the helically shaped dynamic seal ring 232 and the seal groove, in which the helically shaped dynamic seal ring 232 is seated, and out the opening 222 when the actuator piston 204 translates in a positive x-direction. In various embodiments, when the actuator piston 204 translates in a negative x-direction, fluid may flow into the first area 224 via the opening 222 while the helically shaped dynamic seal ring 232 is radially expanded such that the helically shaped dynamic seal ring 232 is in contact with the snubbed stroke range 212.

Figure 6:
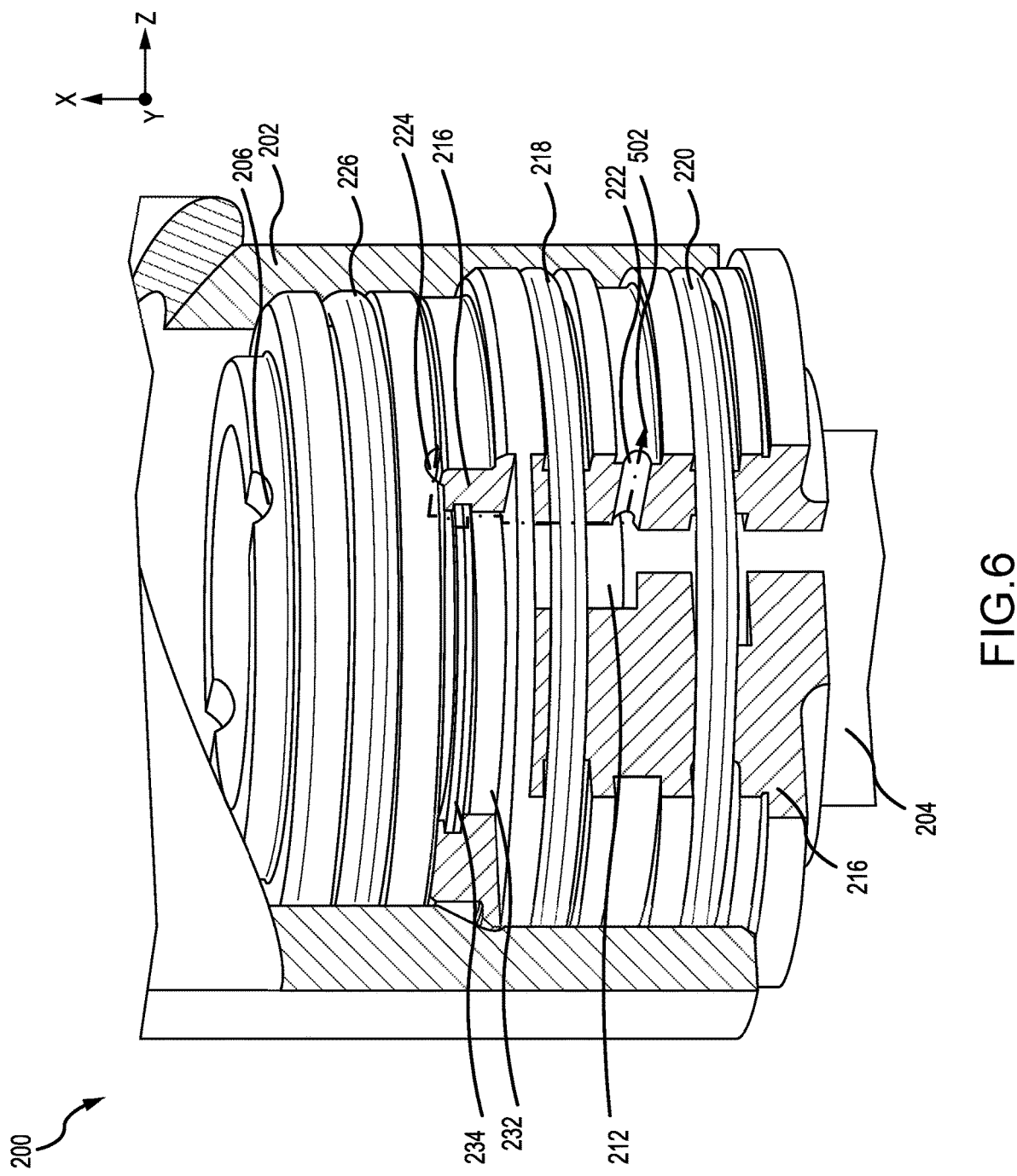
FIG. 6 illustrates a partial cut-away isometric view of a fluid flow path while the helically shaped dynamic seal ring is in contact with the snubbed stroke range of the actuator piston, in accordance with various embodiments.

Referring now to FIG. 6, a partial cut-away isometric view of a fluid flow path while the helically shaped dynamic seal ring is in contact with the snubbed stroke range of the actuator piston is illustrated, in accordance with various embodiments. The hydraulic actuator 200 illustrated and described in FIG. 6 operates in a similar manner to the hydraulic actuator 200 illustrated and described in FIGS. 2, 5A, and 5B. Accordingly elements not specifically described in FIG. 6 operate in a similar manner to the elements described in FIGS. 2, 5A, and 5B. In various embodiments, in the snubbed stroke position, the helically shaped dynamic seal ring 232 is radially expanded such that the helically shaped dynamic seal ring 232 is in contact with the snubbed stroke range 212 and fluid in the first area 224 is able to flow, as indicated by flow path 502, around an outside of the helically shaped dynamic seal ring 232, via a set of snubbing orifices, between the helically shaped dynamic seal ring 232 and the seal groove, in which the helically shaped dynamic seal ring 232 is seated, and out the opening 222 in response to the actuator piston 204 translating in a positive x-direction.

Referring now to FIGS. 7A, 7B, and 7C, a partial cut-away and detailed view of the helically shaped dynamic seal ring's snubbing orifice is illustrated, in accordance with various embodiments. The hydraulic actuator 200 illustrated and described in FIGS. 7A, 7B, and 7C operates in a similar manner to the hydraulic actuator 200 illustrated and described in FIGS. 2, 5A, 5B, and 6. Accordingly elements not specifically described in FIG. 6 operate in a similar manner to the elements described in FIGS. 2, 5A, 5B, and 6. In various embodiments, ends of the helically shaped dynamic seal ring 232 may be removed to form an upper triangular snubbing orifice area 702 and a lower triangular snubbing orifice area 704. In various embodiments, the upper triangular snubbing orifice area 702 extends along a circumference of the helically shaped dynamic seal ring 232 and is formed between the helically shaped dynamic seal ring 232 and the snap ring 234. In various embodiments, the lower triangular snubbing orifice area 704 extends along a circumference of the helically shaped dynamic seal ring 232 and is formed between the helically shaped dynamic seal ring 232 and the bearing 216.

Figure 8A:
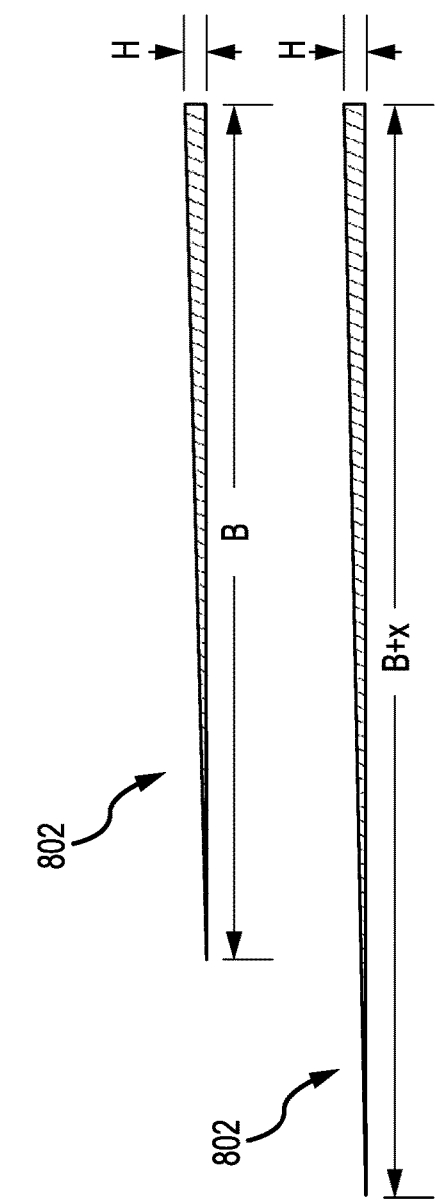
FIGS. 8A and 8B illustrate a snubbing orifice area of a helically shaped dynamic seal ring, in accordance with various embodiments.
Figure 8B:
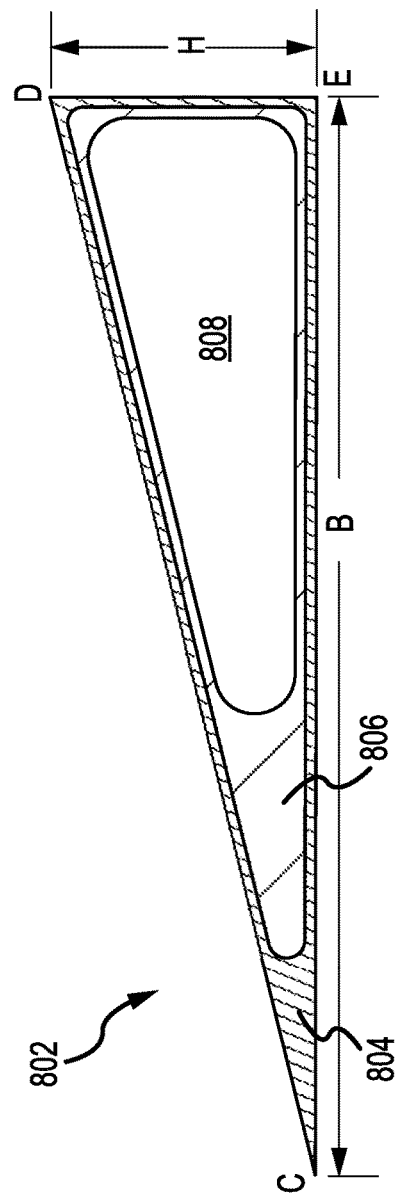

Referring now to FIGS. 8A and 8B, a snubbing orifice area of a helically shaped dynamic seal ring is illustrated, in accordance with various embodiments. In various embodiments, a height H dimension of the snubbing orifice area 802, such as the upper triangular snubbing orifice area 702 or the lower triangular snubbing orifice area 704 of FIGS. 7A and 7B may be set by one dimension on the ring corresponding to an amount of material of the snubbing orifice area 802 is removed from an end of the helically shaped dynamic seal ring 232. In various embodiments, the height H dimension of the snubbing orifice area 802 may not be affected by a diameter of the actuator piston, such as the actuator piston 204 of FIG. 2, or any other dimension. When the helically shaped dynamic seal ring 232 expands around the snubbed stroke range, i.e. the snubbed stroke range 212 of FIG. 2 of the actuator piston, only a base B dimension of the snubbing orifice area 802 is modified, expanding from base B dimension to base B+x. In that regard, only a portion of the snubbing orifice area 802 farthest in the negative z-direction, i.e. farthest to the left in the illustration, experiences significant changes, whereas a portion of the snubbing orifice area 802 farthest in the positive z-direction, i.e. farthest to the right in the illustration, experiences minimal changes.

In various embodiments, due to the entrance and exit effects of the snubbing orifice area 802, the whole area of triangle CDE will not be effective for fluid flow. Several parameters influence the apparent fluid flow area including a shape of the snubbing orifice area 802. As illustrated, fluid flow in the corners of the triangle provide negligible fluid flow 804 because, as the area decreases near a vertex, so does fluid flow efficiency. While less efficient fluid flow 806, which is greater than the negligible fluid flow 804, is provided, a most efficient flid flow 808 is provided when based on the height H dimension. In that regard, the snubbing orifice area 802 may be generally dependent on a single dimension "H", which may improve the precision of snubbing velocities.

Figure 9:
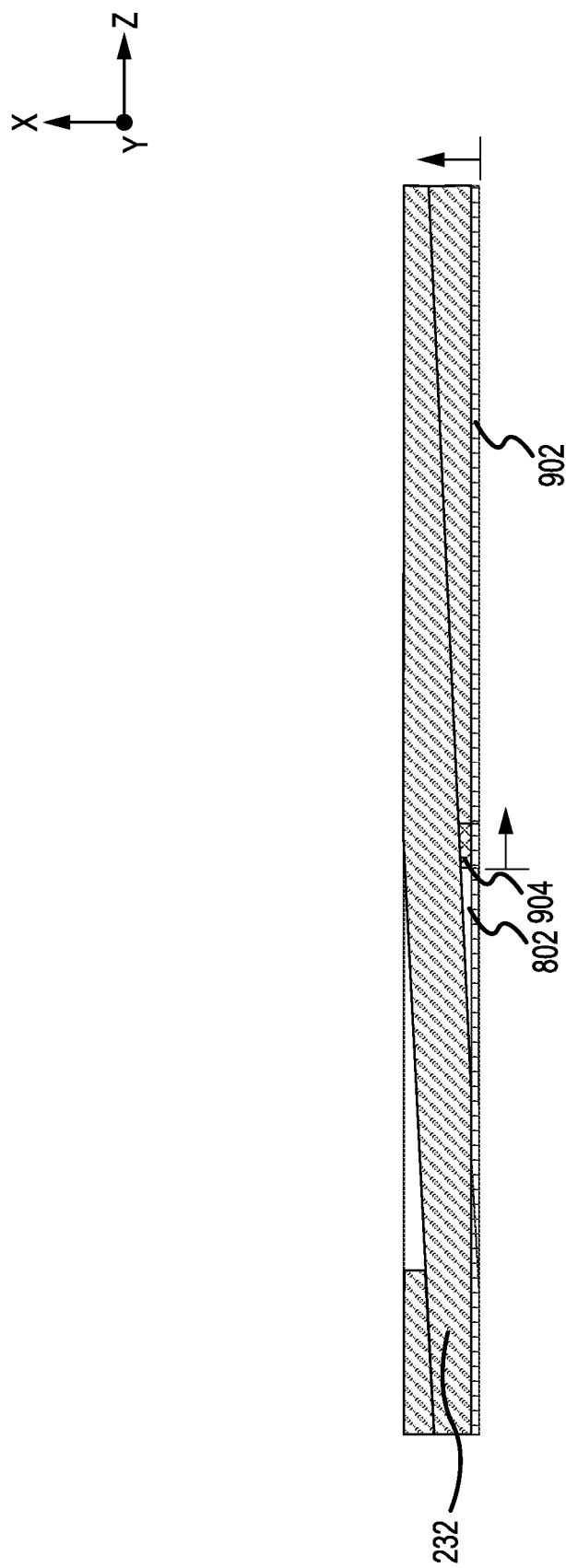
FIG. 9 illustrates reworking of a snubbing orifice area of a helically shaped dynamic seal ring, in accordance with various embodiments

Referring now to FIG. 9, reworking of a snubbing orifice area of a helically shaped dynamic seal ring is illustrated, in accordance with various embodiments. In various embodiments, if the snubbing orifice area 802 is identified as being too large indicating the resulting snubbing velocities are too fast, material 902 may be removed in a positive x-direction from a face of the helically shaped dynamic seal ring 232 to decrease the snubbing orifice area. In various embodiments, if the snubbing orifice area 802 is identified as being too small indicating the resulting snubbing velocities are too slow, material 904 may be removed in a positive z-direction from an end of the helically shaped dynamic seal ring 232 to increase the snubbing orifice area.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear assembly, comprising:
an actuator cylinder;
an actuator piston slidably disposed within the actuator cylinder; and
a helically shaped dynamic seal ring, the helically shaped dynamic seal ring comprising:
a spirally wound body; and
a snubbing orifice area formed in the spirally wound body, wherein:
the spirally wound body is configured to expand in response to contacting a snubbed stroke range of the actuator piston, and the spirally wound body is configured to contract in response to distancing from the snubbed stroke range of the actuator piston, wherein the helically shaped dynamic seal ring is configured to be positioned within a seal groove of a bearing and held within the seal groove via a snap ring, wherein the bearing is positioned within an end of the actuator cylinder and wherein the bearing is positioned around a shaft portion of the actuator piston, and wherein fluid is configured to flow between the helically shaped dynamic seal ring and a standard stroke range of the actuator piston and out an opening of the bearing in response to the helically shaped dynamic seal ring being distanced from the snubbed stroke range of the actuator piston.

2. The landing gear assembly of claim 1, wherein the snubbing orifice area may be decreased by removing material from a face of the spirally wound body.

3. The landing gear assembly of claim 1, wherein the snubbing orifice area may be increased by removing material from at least one end of the spirally wound body.

4. The landing gear assembly of claim 1, wherein the fluid is further configured to flow between the helically shaped dynamic seal ring and the seal groove and out an opening of the bearing in response to the helically shaped dynamic seal ring being in contact with the snubbed stroke range of the actuator piston.

5. The landing gear assembly of claim 1, wherein the spirally wound body is at least one of a spirally or spring wound rectangular wire whose turns or revolutions are kept in contact or a spiral cut tube.

6. An aircraft, comprising:
a landing gear assembly, the landing gear assembly comprising:
an actuator cylinder;
an actuator piston slidably disposed within the actuator cylinder; and
a helically shaped dynamic seal ring, the helically shaped dynamic seal ring comprising:
a spirally wound body; and
a snubbing orifice area formed in the spirally wound body, wherein:
the spirally wound body is configured to expand in response to contacting a snubbed stroke range of the actuator piston, and
the spirally wound body is configured to contract in response to distancing from the snubbed stroke range of the actuator piston, wherein the helically shaped dynamic seal ring is positioned within a seal groove of a bearing and wherein the helically shaped dynamic seal ring is held within the seal groove via a snap ring, wherein the bearing is positioned within an end of the actuator cylinder and wherein the bearing is positioned around a shaft portion of the actuator piston, and wherein fluid is configured to flow between the helically shaped dynamic seal ring and a standard stroke range of the actuator piston and out an opening of the bearing in response to the helically shaped dynamic seal ring being distanced from the snubbed stroke range of the actuator piston.

7. The aircraft of claim 6, wherein the snubbing orifice area is changeable by removing material from the spirally wound body.

8. The aircraft of claim 6, wherein the fluid is further configured to flow between the helically shaped dynamic seal ring and the seal groove and out an opening of the bearing in response to the helically shaped dynamic seal ring being in contact with the snubbed stroke range of the actuator piston.

* * * * *